E. A. McKOY.
APPARATUS FOR TURPENTINE GATHERING.
APPLICATION FILED AUG. 2, 1907.
942,212.
Patented Dec. 7, 1909.
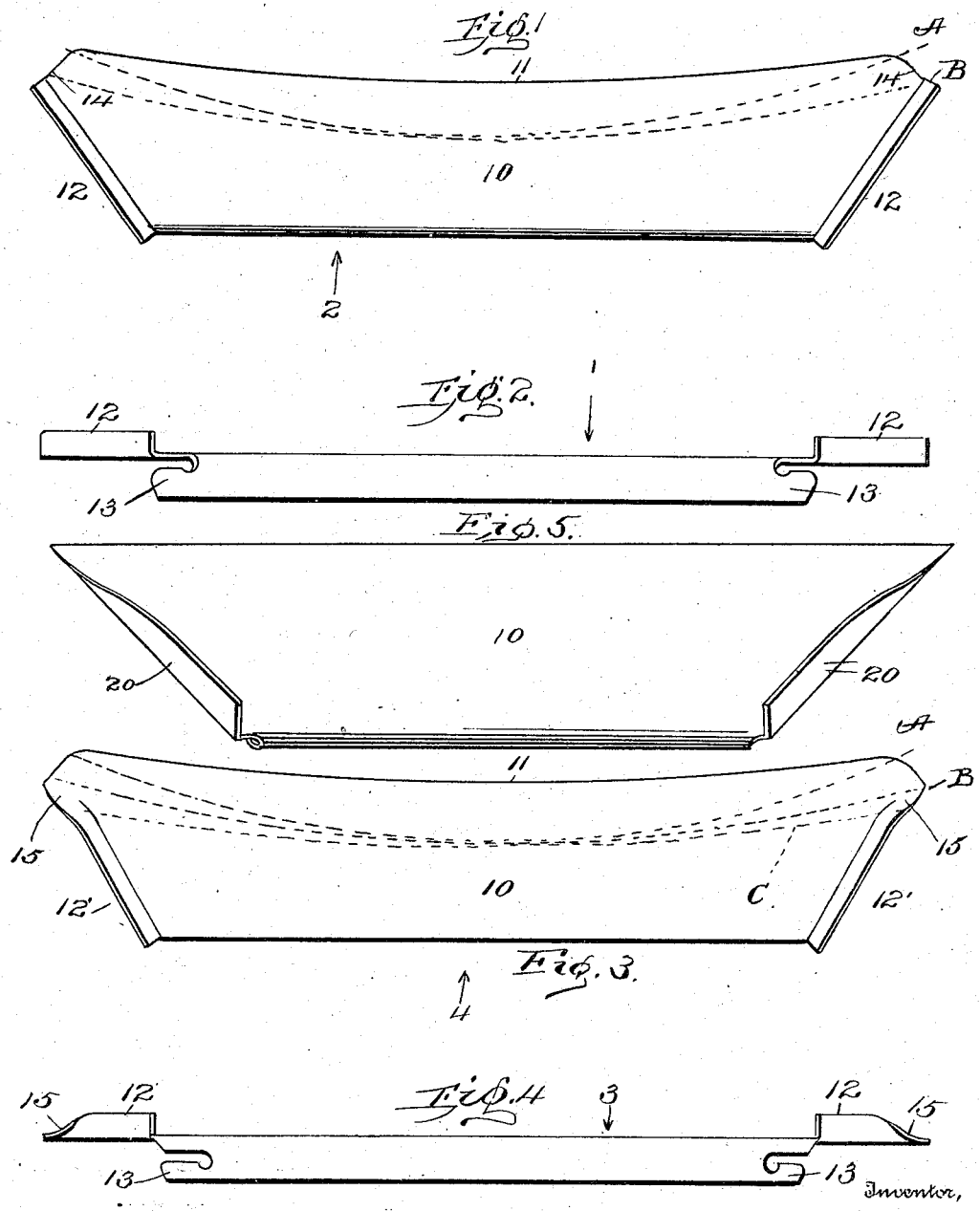

UNITED STATES PATENT OFFICE.

EDWIN A. McKOY, OF NEW ORLEANS, LOUISIANA.

APPARATUS FOR TURPENTINE-GATHERING.

942,212.  Specification of Letters Patent.  Patented Dec. 7, 1909.

Application filed August 2, 1907. Serial No. 386,845.

*To all whom it may concern:*

Be it known that I, EDWIN A. McKOY, a citizen of the United States, residing at New Orleans, in the parish of Orleans and State of Louisiana, have invented certain new and useful Improvements in Apparatus for Turpentine-Gathering; and I do hereby declare the following to be a full, clear, and exact description of the invention, such as will enable others skilled in the art to which it appertains to make and use the same.

This invention relates to turpentine gathering apparatus and has for an object to provide an apron adapted to be inserted in the incisions of trees of various circumferences, and to especially provide that there shall be no obstructions at the corners of aprons caused by the upturned flanges.

A further object of the invention is to provide an apron of the class having the ends formed to permit them to be inserted into the incisions of trees of large circumference.

With these and other objects in view, the invention comprises certain novel constructions, combinations and arrangements of parts as will be hereinafter fully described and claimed.

In the drawings:—Figure 1 is a top plan view of the improved apron. Fig. 2 is a view in lower edge elevation of the apron shown at and taken on arrow 2 of Fig. 1. Fig. 3 is a top plan view of a slightly different embodiment of the improved apron. Fig. 4 is a view in lower edge elevation of the apron shown at and taken on arrow 4 of Fig. 3. Fig. 5 shows a construction similar to Fig. 3 and formed with a straight edge instead of a curved edge for ready insertion into an incision in the tree.

Like characters of reference designate corresponding parts throughout the several views.

The improved apron forming the subject-matter of this invention comprises substantially a plain body portion 10 having its upper longitudinal edge preferably curved or concave as shown at 11, the degree of curvature not being material to the present invention or confined to the curvature disclosed in the drawings. If desired, the edge may be made perfectly straight.

The opposite ends of the apron are reversely inclined converging toward the lower longitudinal edge and are provided with upstanding flanges 12 also reversely inclined with an interval between their lower ends, through which gum dropped upon the apron is permitted to pass over the lower longitudinal edge and into a receptacle suspended beneath the apron in any approved manner as by being supported from the extended ends 13, although not limited to such means for suspending the receptacle, the said suspending means forming no part of the present invention.

When a tree corresponds in curvature to the curvature of the upper edge of the apron as the arc A corresponds therewith, it will be seen that the curvature of the arc crosses the curvature of the apron substantially at the opposite ends of such curvature. When a larger tree is operated upon corresponding to the curvature of the apron as the arc B, corresponds therewith, it will be seen that the apron so curved at its upper edge will hardly engage the tree at all and to permit such engagement the upper extreme corners of the apron are cut away as at 14 to permit the insertion of the said corners within the incision of the tree, as plainly seen by comparing the curvature 11 with the arc B. When a still larger tree is operated upon as indicated by the arc C it becomes necessary to provide means for still further inserting the corners of the apron into the tree and for that purpose the flanges 12′ may have their upper ends as 15 turned or bent downwardly spirally relative to the upstanding flange as shown particularly in Figs. 3 and 4, whereby the apron may be still further inserted at its corners as indicated by comparing the same with the arc C. In the preferred form I have described the same as being provided with a curved upper edge for insertion into an incision in the tree, but it will be evident that my improved apron may be made with a straight upper edge as clearly seen in Fig. 5.

In Fig. 5 the structure shown is somewhat similar to the structure shown in Fig. 3, but the upper edge is formed straight. By this structure together with the bent or curved end flanges 20, the apron may be inserted into an incision in a tree of any diameter and inserted into the same to such a depth as to firmly hold the apron in position at all times.

It will be observed that aprons constructed according to the present invention may be either curved or straight, as desired, for ready insertion into the incision in the tree, the apron formed with curved edges being preferably designed to be inserted into trees of comparatively smaller diameter while the aprons formed with straight edges are more particularly designed to be inserted into trees of greater diameter, but it will be evident that any form of apron or edge may be used upon any size tree to advantage.

In operating upon small trees as indicated by the arc C the gum is dropped from the cutting in a limited space so as to fall safely between the flanges 12 even though there is no close connection between such flanges and the periphery of the tree. When a larger tree is operated upon it becomes desirable to have the flanges in contact with the surface of the tree, which may be done by the employment of the construction shown in the drawings.

Inserting an apron into a gash is sometimes very difficult of accomplishment for the reason that the gash may either be obstructed in some manner by roughness, or the apron may have become bent on its upper edge, and in this case instead of inserting it from directly in front the corner of apron is inserted in end of gash and slid longitudinally therein. The apron being pliable, it either follows the gash or removes the obstruction by pushing it out at the opposite end, and thus the apron is positioned on the tree when it could not have been so positioned if the whole apron were placed in the gash at one time, nor could the apron have been used at all in this manner if flanges were carried up to the extreme corners.

What I claim is:—

1. An apron embodying an insertion edge and flanges at opposite ends bent spirally adjacent the insertion edge.

2. An apron embodying an insertion edge, and reversely inclined flanges at opposite ends bent spirally at the insertion edge and at the ends most widely separated.

3. An apron embodying an insertion edge and flanges at opposite ends bent spirally at their extremities adjacent the insertion edge.

4. An apron embodying an insertion edge and reversely inclined flanges at opposite ends bent spirally at their extremities adjacent the insertion edge and most widely separated.

5. An apron embodying an insertion edge and flanges at the opposite ends having their upper ends cut away and bent spirally to facilitate insertion of the insertion edge.

6. An apron embodying an insertion edge and flanges at the opposite ends having their upper ends cut away and bent spirally substantially into the plane of the insertion edge to facilitate insertion of such insertion edge.

7. In a device of the class described, an apron provided with flanges at its opposite ends upstanding relative to the plane of the apron, and with their upper ends twisted spirally relative to the main portion of the flanges.

8. In a device of the class described, an apron comprising a substantially plain body portion, flanges upstanding at its opposite ends approximately perpendicular to the plane of the apron, and with their upper ends twisted spirally relative to the upstanding portions.

9. In a device of the class described, an apron comprising a substantially plain body portion, flanges formed at the opposite ends of the body portion and having the upper opposite corners cut upon angles relative to the flanges and with the upper corners of the flanges twisted spirally relative to the upstanding portion.

10. In a device of the class described, an apron having flanges at its opposite ends, said flanges standing substantially upright adjacent the apron's lower longitudinal edge and bent outward near the upper edge of the apron terminating in a substantially flat corner on a plane with surface of apron.

In testimony whereof I affix my signature in presence of two witnesses.

EDWIN A. McKOY

Witnesses:
ARTHUR VIZARD, Jr.,
JAMES J. McLAUGHLIN